United States Patent [19]

Bradus et al.

[11] Patent Number: 5,896,024
[45] Date of Patent: Apr. 20, 1999

[54] METHOD AND APPARATUS FOR MANUALLY SELECTING BATTERY CHARGING PROCESS

[75] Inventors: Robert Bradus, Bel Air; Janet Embrey, Fallston, both of Md.

[73] Assignee: Black & Decker, Inc., Newark, Del.

[21] Appl. No.: 09/047,171

[22] Filed: Mar. 24, 1998

[51] Int. Cl.$^6$ .................................................. H01M 10/46
[52] U.S. Cl. .................................................. 320/125; 320/160
[58] Field of Search ......................... 320/125, 132, 320/134, 150, 160, 161, 162, 164, FOR 118, FOR 119, FOR 121, FOR 129, FOR 138

[56] References Cited

U.S. PATENT DOCUMENTS

| | | |
|---|---|---|
| 3,917,990 | 11/1975 | Sherman, Jr. . |
| 4,019,120 | 4/1977 | Fattic . |
| 4,079,303 | 3/1978 | Cox . |
| 4,238,721 | 12/1980 | DeLuca et al. . |
| 4,614,905 | 9/1986 | Petersson et al. . |
| 4,719,401 | 1/1988 | Altmejd . |
| 4,755,733 | 7/1988 | Laliberte . |
| 4,833,459 | 5/1989 | Geuer . |
| 5,003,244 | 3/1991 | Davis, Jr. . |
| 5,150,033 | 9/1992 | Conway .................. 320/112 |
| 5,204,611 | 4/1993 | Nor et al. . |
| 5,218,286 | 6/1993 | VanDunk . |
| 5,363,031 | 11/1994 | Miller et al. ................ 320/115 |
| 5,493,198 | 2/1996 | Kamke . |
| 5,493,199 | 2/1996 | Koenck et al. .............. 320/106 |
| 5,523,668 | 6/1996 | Feldstein . |
| 5,600,231 | 2/1997 | Parker . |
| 5,629,601 | 5/1997 | Feldstein . |
| 5,637,979 | 6/1997 | Tamai et al. . |
| 5,666,041 | 9/1997 | Stuart et al. . |
| 5,675,258 | 10/1997 | Kadouchi et al. . |
| 5,712,795 | 1/1998 | Layman et al. ............... 330/131 X |

FOREIGN PATENT DOCUMENTS

| | | |
|---|---|---|
| 0629032 | 12/1994 | European Pat. Off. . |
| 9624979 | 8/1996 | WIPO . |

OTHER PUBLICATIONS

Panasonic Palmcorder™ Camcorder Instruction Manual, p. 10, no date.

*Primary Examiner*—Edward H. Tso
*Attorney, Agent, or Firm*—Adan Ayala

[57] ABSTRACT

A method for charging a rechargeable battery pack includes providing a charger having first and second charging processes, and manually selecting one of the first and second charging processes. The charging method may include a step for indicating status or end of the selected one charging process. The first charging process may include the steps of providing a fast charging current, indicating end of the fast charging current and providing an equalization current. The second charging process may include the steps of providing a fast charging current, subsequently providing an equalization current and indicating end of equalization current. The second charging process may also include a temperature checking step. Further disclosed is a battery charging apparatus including a charger for charging a battery and having first and second charging processes, and a switch connected to the charger for manually selecting one of the first and second charging processes. The charger may include a microprocessor. Further, the apparatus may include a display output and/or sound output connected to the charger. The display output and/or sound output may indicate status or end of the selected one charging process. The display output may comprise a light bulb, a light emitting diode and/or a liquid crystal display. The sound output may comprise a speaker and/or a piezo-electric device.

38 Claims, 2 Drawing Sheets

5,896,024

METHOD AND APPARATUS FOR MANUALLY SELECTING BATTERY CHARGING PROCESS

FIELD OF THE INVENTION

This invention relates generally to a method and apparatus for charging rechargeable batteries.

BACKGROUND OF THE INVENTION

The battery packs for portable power tools, outdoor tools, and certain kitchen and domestic appliances usually have several cells disposed in series. Users typically remove the battery packs from the battery charger after completion of the fast charging process, but before sufficient equalizing charge has been provided to the battery for equalizing the capacities of the various cells. Over time, the cell capacities become further out of balance, with some cells becoming significantly lower in capacity relative to the others.

The battery pack is typically usable until the charge in the lower-capacity cells is depleted. Accordingly, the user perceives that the capacity of the battery pack and/or battery life is decreased and may incorrectly attribute this to a "memory" problem. The user may also perceive that the battery pack may be defective.

It is preferable to provide a method and apparatus that enables the user to equalize, or "refresh," the cell capacities, in order to restore battery pack capacity.

SUMMARY OF THE INVENTION

In accordance with the present invention, a method for charging a rechargeable battery pack is proposed. The charging method includes providing a charger having first and second charging processes, and manually selecting one of the first and second charging processes. The charging method may include a step for indicating status or end of the selected one charging process. The first charging process may include the steps of providing a fast charging current, indicating end of the fast charging current and providing an equalization current. The second charging process may include the steps of providing a fast charging current, subsequently providing an equalization current and indicating end of equalization current. The first or second charging processes may also include a temperature checking step.

Also disclosed herein is a battery charging apparatus comprising a charger for charging a battery and having first and second charging processes, and a switch connected to the charger for manually selecting one of the first and second charging processes. The charger may include a microprocessor. Further, the apparatus may include a display output and/or sound output connected to the charger. The display output and/or sound output may indicate status or end of the selected one charging process. The display output may comprise a light bulb, a light emitting diode and/or a liquid crystal display. The sound output may comprise a speaker and/or a piezo-electric device.

Additional features and benefits of the present invention are described, and will be apparent from, the accompanying drawings and the detailed description below.

BRIEF DESCRIPTION OF THE INVENTION

The accompanying drawings illustrate preferred embodiments of the invention according to the practical application of the principles thereof and in which:

FIG. 1 is a circuit schematic diagram of a battery charger according to the present invention; and FIG. 2 is a flowchart illustrating the charging process according to the present invention.

DETAILED DESCRIPTION

The invention is now described with reference to the accompanying figures, wherein like numerals designate like parts. All the teachings of the Saar U.S. Pat. Nos. 4,388,582 and 4,392,101 are hereby incorporated by reference into this specification.

Figure 1:
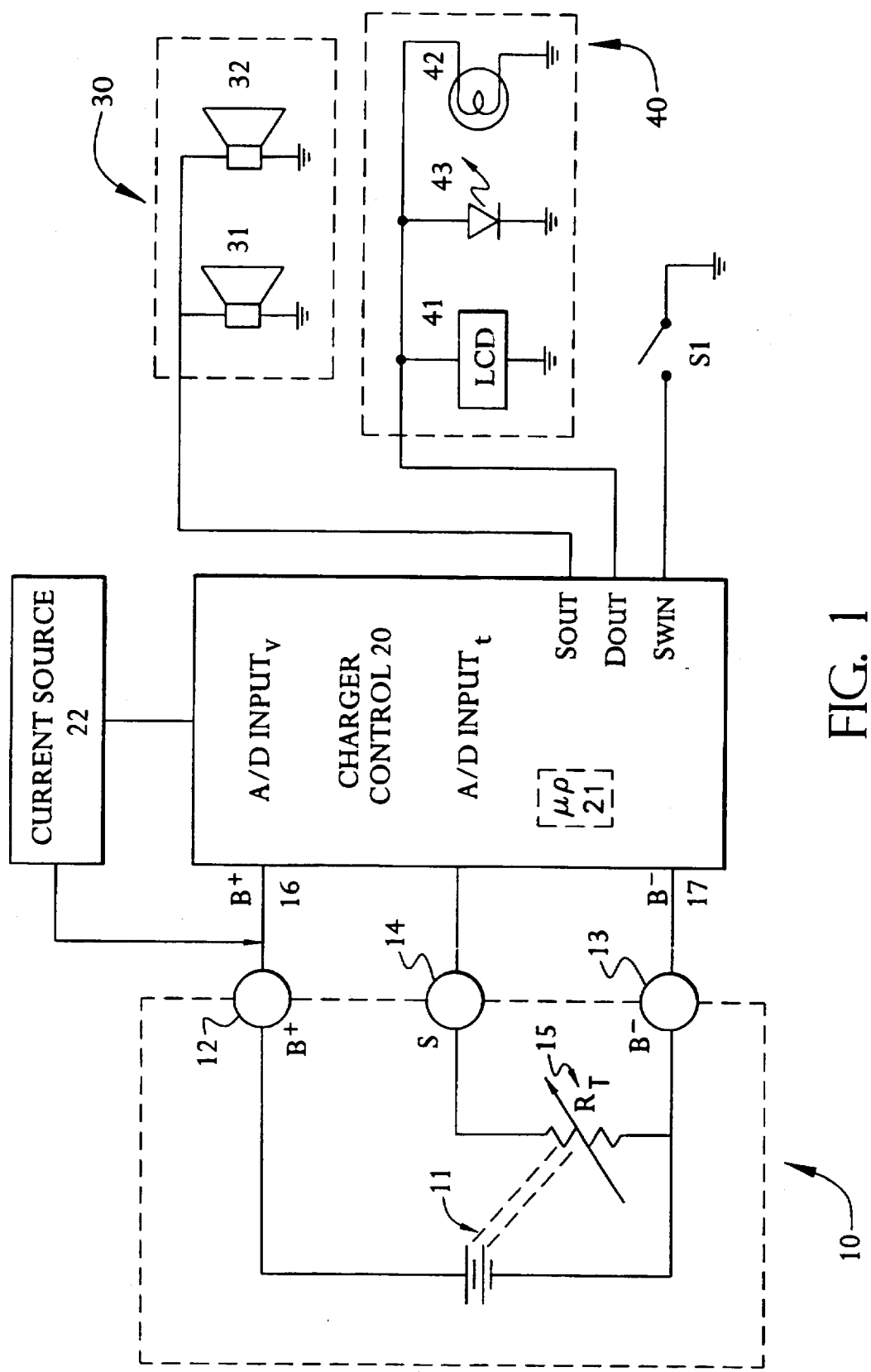

Referring to FIG. 1, a battery 10 is connected to a charger control circuit 20. Battery 10 comprises a plurality of battery cells 11 connected in series, which dictate the voltage and storage capacity for battery 10. Battery 10 includes three battery charging contacts: first battery contact 12, second battery contact 13, and third battery contact 14. Battery contact 12 is the B+ (positive) terminal for battery 10. Battery contact 13 is the B− or negative/common terminal. Battery contact 14 is the S or sensing terminal. Battery contacts 12 and 13 receive the charging current sent from the charger control circuit 20 (preferably from current source 22, as discussed below) for charging the battery 10.

As shown in FIG. 1, the battery cells 11 are coupled between the battery contacts 12 and 13. In addition, preferably coupled between battery contacts 13 and 14 is a temperature sensing device 15, such as a negative temperature co-efficient (NTC) resistor, or thermistor, $R_T$. The temperature sensing device is preferably in closer proximity to the cells 11 for monitoring of the battery temperature. Persons skilled in the art will recognize that other components, such as capacitors, etc., or circuits can be used to provide a signal representative of the battery temperature.

The charger control circuit 20 includes positive terminal (B+) 16 and negative (B−) terminal 17, which are coupled to battery 10 via battery contacts 12 and 13, respectively. The positive terminal may also act as an analog/digital input $A/DINPUT_v$, in order for the charger control circuit 20 to detect the battery voltage. In addition, the charger control circuit 20 may include an analog/digital input $A/DINPUT_T$, which is coupled to the temperature sensing device 15 via the third battery contact 14 (S). This allows the charger control circuit 20 to monitor the battery temperature. Charger control circuit 20 includes a microprocessor 21 for controlling the charging and monitoring operations. Charger control circuit 20 may control a current source 22 that provides current to battery 10. This current may be a fast charging current and/or an equalization current. Current source 22 may be integrated within charger control circuit 20.

Switch S1 is connected to charger control circuit 20 via switch input SWIN. Switch S1 will be used to select the desired charging mode, or charging process, as discussed below.

Sound output circuit 30 may be connected to charger control circuit 20 via sound output SOUT. Circuit 30 may include a speaker 31 and/or piezo-electric device 32. Circuit 30 will emit an audio signal for indicating status and/or end of the charging processes, as discussed below. Persons skilled in the art will recognize that circuit 30 may also be integrated within charger control circuit 20.

Similarly, display output circuit 40 may be connected to charger control circuit 20 via display output DOUT. Circuit 40 may include a liquid crystal display (LCD) 41, a light bulb 42 and/or a light emitting diode (LED) 43. Circuit 40 will emit a visual signal for indicating status and/or end of the charging processes, as discussed below. Persons sidled in the art will recognize that circuit 40 may also be integrated within charger control circuit 20.

Figure 2:
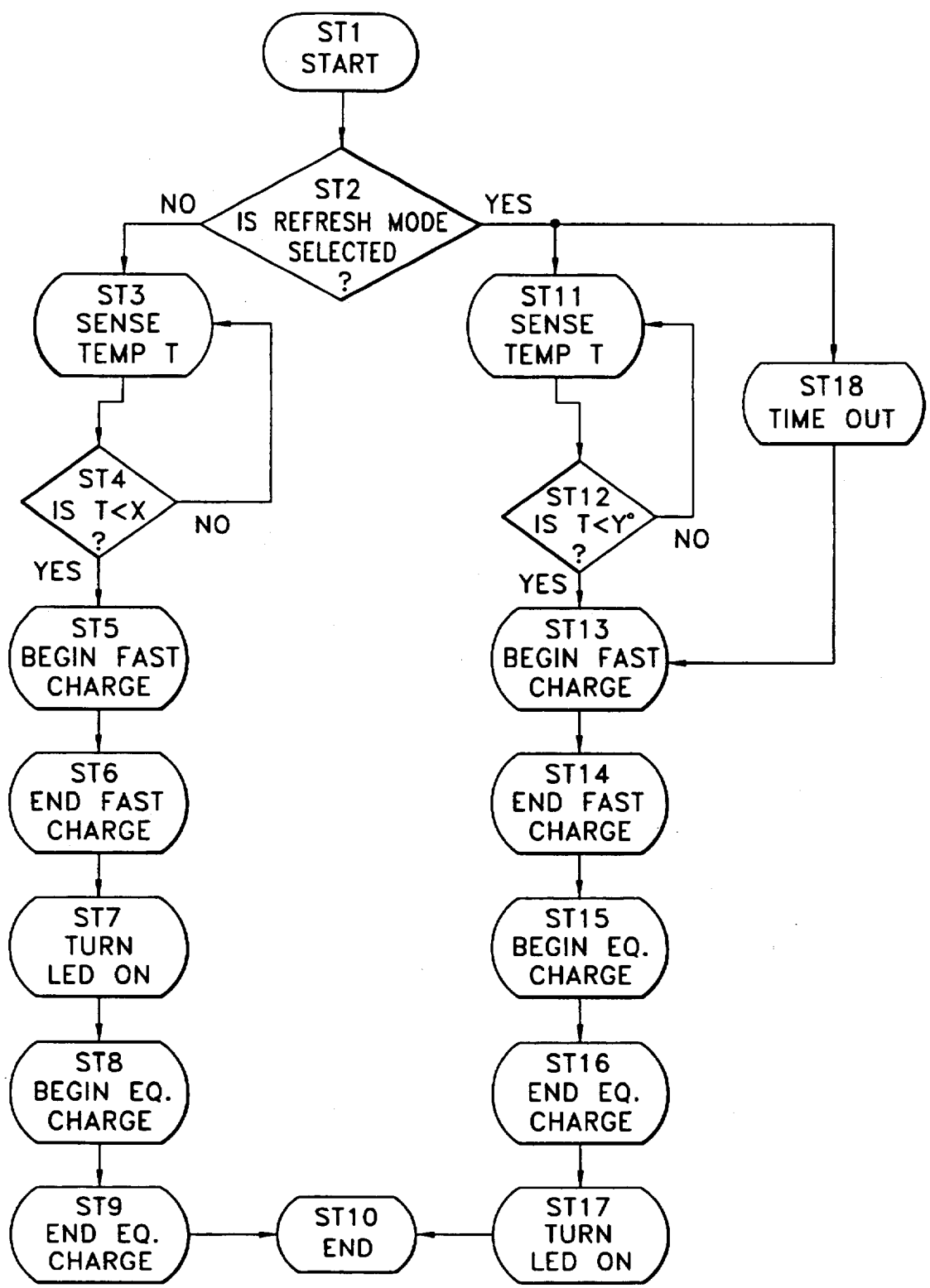

FIG. 2 is a flowchart of the different steps comprised in the proposed method. The first step (ST1) is to begin the charging process. The charger control circuit 20 checks the status of switch SW1 to determine which charging mode or process to use (ST2). In the present embodiment, the user may select between a fast charging process and a "refresh" process for equalizing the battery cells.

Persons skilled in the art will recognize that this checking step ST2 may be periodically conducted throughout the entire process shown in FIG. 2, allowing the user to select and change the charging process at any time during the proposed method. Accordingly, in the present embodiment, the user may be able to select between a fast charging process and a refresh process at any time during the proposed method.

Assuming the user selects the fast charging process, the charger control circuit 20, via its A/D inputs, may sense the battery temperature T (ST3). The charger control circuit 20 preferably continues to sense the battery temperature until it is below a predetermined temperature X (ST4). Preferably, the predetermined temperature X for NiCd batteries is between about 45° and 65° Celsius, with the preferred temperature being about 55° Celsius. This preferred temperature has been selected as a compromise between the battery cooling time, which increases the time required for charging the battery pack and the battery charge acceptance characteristics.

When the battery temperature is below X, the charger control circuit 20 sends a fast charging current into the battery, in order to recharge the battery (ST5). The charger control circuit 20 may then monitor different battery parameters, including current, voltage and temperature of the battery, to terminate the fast charging current (ST6).

Persons skilled in the art will recognize that any voltage monitoring methods, including the Saar double inflection termination method described in U.S. Pat. Nos. 4,388,582 and 4,392,101, the minus-delta-voltage method, the peak detect method, and/or the voltage slope detect method may be used to terminate the fast charging current. Similarly, persons skilled in the art will recognize that temperature monitoring methods, including the absolute temperature termination method and/or the temperature change rate termination method may be used to terminate the fast charging current.

Upon termination of the fast charging current, circuits 30 and/or 40 may indicate the end of the fast charging process (ST7). Accordingly, a sound signal may be emitted by speaker 31 and/or piezo-electric device 32. Similarly, a visual signal may be emitted by a liquid crystal display (LCD) 41, a light bulb 42 and/or a light emitting diode (LED) 43. Preferably, a visual signal is emitted by the LED 43.

Simultaneously or soon thereafter, a small equalization current is applied to battery 10 (ST8). Charger control circuit 20 preferably will continue to apply the equalization current until the battery 10 is disconnected or until a predetermined time period has elapsed (ST9). Preferably the time period is between four and eight hours. Afterwards, the charging process is complete (ST10).

Assuming the user selects the refresh mode, the charger control circuit 20, via its A/D inputs, may sense the battery temperature T (ST11). The charger control circuit 20 preferably continues to sense the battery temperature until it is below a predetermined temperature Y (ST12). Preferably, the predetermined temperature Y is below or around the lower end of the range for predetermined temperature X.

Accordingly, the preferred temperature for predetermined temperature Y is about 45° Celsius for NiCd batteries. This temperature has been selected to increase the charge acceptance of the battery, at the expense of waiting time.

Alternatively, the charger control circuit 20 may suspend the charging process until a predetermined period of time has elapsed (ST18). Preferably, this period of time is about 2 hours.

When the battery temperature is below Y or after the predetermined period of time has elapsed, the charger control circuit 20 preferably sends a current into the battery. Preferably, the charger control circuit 20 sends a fast charging current into the battery 10 (ST13), as explained above. However, persons skilled in the art will recognize that the circuit 20 may send any other current into the battery 10, when implementing the present invention. The charger control circuit 20 may then monitor the different battery parameters, including current, voltage and temperature of the battery, to terminate the fast charging current (ST14), as explained above.

After the fast charging current is terminated, a small equalization current may be applied to battery 10 (ST15). Charger control circuit 20 will preferably continue to apply the equalization current until the battery 10 is disconnected or until a predetermined time period has elapsed (ST16). Preferably the time period is between four and eight hours.

When the predetermined time period has elapsed, circuits 30 and/or 40 may indicate the end of the refresh mode (ST17). Accordingly, a sound signal may be emitted by speaker 31 and/or piezo-electric device 32. Similarly, a visual signal may be emitted by a liquid crystal display (LCD) 41, a light bulb 42 and/or a light emitting diode (LED) 43. Afterwards, the charging process is complete (ST10).

Persons skilled in the art may recognize that the battery pack 10 is not wholly discharged and then charged during the refresh mode in the preferred embodiment.

Persons skilled in the art may recognize other alternatives or additions to the means or steps disclosed herein. However, all these additions and/or alterations are considered to be equivalents of the present invention.

What is claimed is:

1. A battery charging apparatus comprising:
    a charger for charging a battery and having a first and second charging processes; and
    a switch connected to the charger for manually selecting between the first and second charging processes,
    wherein the first charging process is a fast charging process and the second charging process is an equalization process.

2. The apparatus of claim 1, wherein the charger comprises a microprocessor.

3. The apparatus of claim 1, further comprising a display output connected to the charger.

4. The apparatus of claim 3, wherein the display output comprises at least one of the group comprising a light emitting diode, a liquid crystal display and a light bulb.

5. The apparatus of claim 3, wherein the display output indicates status of a selected charging process.

6. The apparatus of claim 3, wherein the display output indicates end of a selected charging process.

7. The apparatus of claim 1, further comprising a sound output connected to the charger.

8. The apparatus of claim 7, wherein the sound output comprises at least one of the group comprising a speaker and a piezo-electric member.

9. The apparatus of claim 7, wherein the display output indicates status of a selected charging process.

10. The apparatus of claim 7, wherein the display output indicates end of a selected charging process.

11. The apparatus of claim 1, wherein the first charging process comprises providing a fast charging current to the battery, indicating end of fast charging current and providing an equalization current to the battery.

12. The apparatus of claim 1, wherein the second charging process comprises providing a fast charging current to the battery, providing an equalization current to the battery and indicating end of the equalization current.

13. The apparatus of claim 1, wherein the second charging process comprises providing an equalization current to the battery and indicating end of the equalization current.

14. The apparatus of claim 1, wherein the first charging process comprises sensing battery temperature.

15. The apparatus of claim 1, wherein the second charging process comprises sensing battery temperature.

16. The apparatus of claim 1, wherein the second charging process equalizes the battery without substantially discharging the battery.

17. A method for charging a battery comprising:

providing a charger having first and second charging processes; and manually switching the charger between first and second charging processes, wherein the first charging process is a fast charging process and the second charging process is an equalization process.

18. The charging method of claim 17, further comprising indicating status of a selected charging process.

19. The charging method of claim 17, further comprising indicating end of a selected charging process.

20. The charging method of claim 17, wherein the first charging process comprises providing a fast charging current, indicating end of the fast charging current and providing an equalization current.

21. The charging method of claim 20, wherein the first charging process comprises sensing battery temperature.

22. The charging method of claim 17, wherein the second charging process comprises providing a fast charging current to the battery, providing an equalization current to the battery and indicating end of the equalization current.

23. The charging method of claim 22, wherein the second charging process comprises sensing battery temperature.

24. The charging method of claim 17, wherein the second charging process comprises providing an equalization current to the battery and indicating end of the equalization current.

25. The charging method of claim 17, wherein the second charging process equalizes the battery without substantially discharging the battery.

26. A battery charging apparatus comprising:

a charger for charging a battery and having a fast charging process and a refresh process; and a switch connected to the charger for manually selecting between the fast charging and refresh processes;

wherein the fast charging process comprises providing a fast charging current to the battery, indicating end of fast charging current and providing an equalization current to the battery, and the refresh process comprises providing an equalization current to the battery and indicating end of the equalization current.

27. The apparatus of claim 26, wherein the charger comprises a microprocessor.

28. The apparatus of claim 26, further comprising a display output connected to the charger.

29. The apparatus of claim 28, wherein the display output comprises at least one of the group comprising a light emitting diode, a liquid crystal display and a light bulb.

30. The apparatus of claim 28, wherein the display output indicates end of fast charging current or equalization current.

31. The apparatus of claim 26, wherein the refresh process comprises sensing battery temperature.

32. The apparatus of claim 26, wherein the refresh process comprises suspending current sent to the battery until a predetermined period of time has elapsed.

33. The apparatus of claim 26, wherein the refresh process comprises providing a fast charging current to the battery.

34. The apparatus of claim 26, wherein the refresh process equalizes the battery without substantially discharging the battery.

35. A method for charging a battery comprising:

providing a charger having fast charging and refresh processes; and manually switching the charger between the fast charging and refresh processes; wherein the fast charging process comprises providing a fast charging current to the battery, indicating end of fast charging current and providing an equalization current to the battery, and the refresh process comprises providing an equalization current to the battery and indicating end of the equalization current.

36. The charging method of claim 35, wherein the refresh process comprises sensing battery temperature.

37. The charging process of claim 35, wherein the refresh process comprises suspending current sent to the battery until a predetermined period of time has elapsed.

38. The charging process of claim 35, wherein the refresh process comprises providing a fast charging current to the battery.

* * * * *